United States Patent

Fischerkeller et al.

Patent Number: 6,155,302

Date of Patent: *Dec. 5, 2000

[54] FASTENING DEVICE FOR ATTACHING A FUEL LINE TO A CONNECTING PIECE

[75] Inventors: Rolf Fischerkeller, Walheim; Wolfgang Wuerl, Sachsenheim, both of Germany

[73] Assignee: Robert Bosch GmbH, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/930,726

[22] PCT Filed: Oct. 14, 1996

[86] PCT No.: PCT/DE96/01955

§ 371 Date: Sep. 17, 1997

§ 102(e) Date: Sep. 17, 1997

[87] PCT Pub. No.: WO97/27394

PCT Pub. Date: Jul. 31, 1997

[30] Foreign Application Priority Data

Jan. 27, 1996 [DE] Germany .............................. 196 02 907

[51] Int. Cl.[7] .................................. F16L 9/00; F16L 33/02
[52] U.S. Cl. .......................... 138/109; 138/120; 285/242; 285/420
[58] Field of Search ..................................... 138/109, 120, 138/155; 285/242, 252, 256, 260, 241, 420

[56] References Cited

U.S. PATENT DOCUMENTS

| | | | |
|---|---|---|---|
| 1,138,946 | 5/1915 | Elliott | 285/242 X |
| 2,260,454 | 10/1941 | Hedeman | 285/242 |
| 3,653,692 | 4/1972 | Henson | 285/242 |
| 3,891,250 | 6/1975 | Oetiker | 285/242 |
| 3,938,237 | 2/1976 | Dunz | 285/242 X |
| 4,367,705 | 1/1983 | Oeth | 123/198 DB |
| 4,603,890 | 8/1986 | Huppee | 285/242 X |
| 4,790,569 | 12/1988 | Chaffee | 285/242 X |
| 4,826,477 | 5/1989 | Adams | 285/242 X |
| 5,082,315 | 1/1992 | Sauer | 285/256 |
| 5,148,792 | 9/1992 | Tuckey | 123/497 |
| 5,365,906 | 11/1994 | Deweerdt | 123/467 |
| 5,469,829 | 11/1995 | Kleppner et al. | 123/514 |
| 5,735,554 | 4/1998 | Imgam | 285/242 X |

FOREIGN PATENT DOCUMENTS

| | | |
|---|---|---|
| 3727908 | 8/1987 | Germany . |
| 3911406 | 4/1989 | Germany . |
| 42 24 981 A1 | 3/1994 | Germany . |

OTHER PUBLICATIONS

European Patent Application 652397 A Mogavero, Nov. 1994.

PCT Pub WO 91/05159 Harde, Sep. 1990.

*Primary Examiner*—Patrick Brinson
*Attorney, Agent, or Firm*—Michael J. Striker

[57] ABSTRACT

An attachment arrangement has a fuel line formed as a plastic tube, and a connector for connecting the fuel line to a fuel supply system, the connector having a plurality of collars spaced from one another in a direction of a longitudinal axis of the connector and protruding from an outer circumference of the connector, an elastically widenable bush arranged on the plastic tube of the fuel line in a region which is slippable onto the connector, the connector and the bush being composed of a same plastic, and the plastic tube which forms the fuel line being formed as a rigid tube.

4 Claims, 1 Drawing Sheet

FASTENING DEVICE FOR ATTACHING A FUEL LINE TO A CONNECTING PIECE

BACKGROUND OF THE INVENTION

The invention is based on an attachment arrangement for a fuel line on a connector.

One such attachment arrangement is known from German Patent Disclosure DE 42 24 981. In it, the fuel line is secured to a connector of a component of a fuel supply system. Fuel lines may be embodied either as plastic tubes or as flexible hoses, but tubes are cheaper than hoses. When tubes are used, the connector typically has a plurality of collars, protruding from its outer circumference and spaced apart from one another in the direction of its longitudinal axis, and is embodied in Christmas-tree form. The tube can be attached to the connector by being slipped onto in the direction of its longitudinal axis; this is intended to prevent the tube from slipping off or being pulled off by the collars, which dig into the tube in clawlike fashion, and at the time is intended to attain sealing. It has been found that in this attachment arrangement, after severe heating of the tube, adequate sealing is no longer assured because the tube widens in a lasting way. In addition, while the tube can be held on the connector by means of a hose clamp, this clamp has to be constructed in a complicated way, in order to distribute the pressure uniformly over the circumference of the tube, and it is time-consuming to assemble.

SUMMARY OF THE INVENTION

Accordingly, it is an object of present invention to provide an attachment arrangement of the above mentioned general type, which avoids the disadvantages of the prior art.

In keeping with these objects and with others which will become apparent hereinafter, one feature of present invention resides, briefly stated, in an attachment which has a fuel line formed as a plastic tube, a connector provided with a plurality of collars and an elastically widenable bush, wherein in accordance with the present invention the connector and the bush are made of the same plastic and the fuel line is composed of a rigid tube.

The attachment arrangement of the invention for a mounting a fuel line on a connector has the advantage over the prior art that the fuel line can still be attached in a simple way by being slipped onto the connector, and the tightness is assured by the bush. The bush can be disposed on the fuel line even before the fuel line is slipped onto the connector, and it widens elastically when the fuel line is slipped on, so that once the fuel line is disposed on the connector, an additional exertion of pressure by the bush is obtained. By the further embodiment of the fuel line, the bush is fixed in a simple way in the direction of the longitudinal axis of the connector.

BRIEF DESCRIPTION OF THE DRAWING

An exemplary embodiment of the invention is shown in the drawing and described in further detail below.

DESCRIPTION OF THE PREFERRED EMBODIMENT

Figure 1:
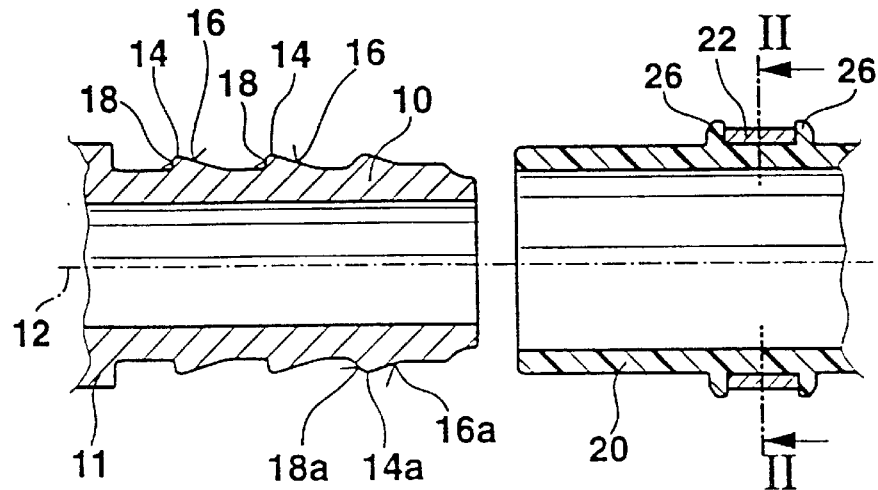
FIG. 1 shows a connector and a fuel line to be attached to it.
Figure 2:
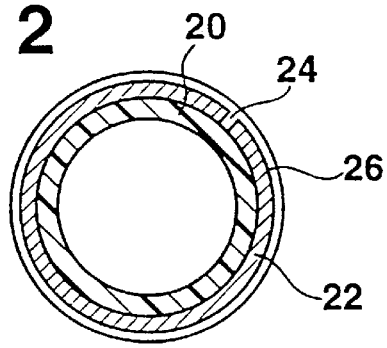
FIG. 2 shows the fuel line in a cross section taken along the line II—II of FIG. 1.
Figure 3:
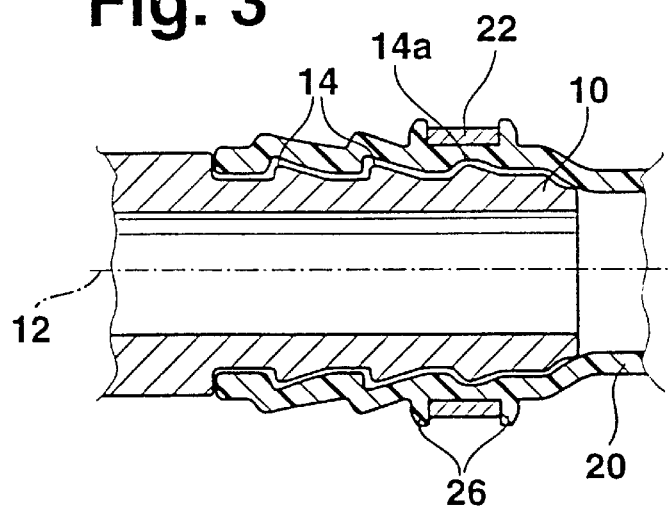
FIG. 3 shows the connector with the fuel line mounted on it.

An attachment arrangement for a fuel line on a connector, shown in FIGS. 1–3, can be provided for instance in a fuel supply system by which fuel is fed from a tank to the internal combustion engine of a motor vehicle. The connector 10 can be disposed for instance on a supply assembly 11, not shown, or on arbitrary other components of the fuel supply system. The connector 10 may be of metal, or preferably of fuel-resistant plastic.

The connector 10 has a plurality of collars 14, spaced apart from one another in the direction of its longitudinal axis 12 and protruding outward from its outer circumference. The collars 14 each have a chamfer 16, oriented toward the free end of the connector 10, and on their opposite ends they heave have a shoulder 18 disposed approximately perpendicular to the longitudinal axis 12. The connector 10 thus has a so-called Christmas-tree profile on its outer circumference. It may be provided that at the closest collar 14a, the free end of the connector 10 protrudes less far from the outer circumference of the connector 10. As an alternative, or in addition, it may be provided that the collar 14a is less sharp-edged, i.e. that its shoulder 18a is chamfered away from the free end of the connector 10, and/or that the transition between the chamfer 16a and the shoulder 18a is rounded. The connector 10 is chamfered on its free end toward its longitudinal axis 12.

The fuel line 20 is embodied as a rigid tube made of fuel-resistant plastic. It may be embodied in some segments as a so-called corrugated tube, to allow its course to be adapted flexibly to particular installation conditions. On the end region of the tube 20 that can be slipped onto the connector 10, there is a bush 22, which can be widened elastically. The elastic widenability of the bush 22 can be achieved by means of a longitudinal slit 24, for instance, or by using a sufficiently elastically deformable material for the bush 22, which can then be embodied as a completely closed ring. The bush 22 is embodied with thin walls; that is, its thickness in the radial direction to the longitudinal axis 12 is less than its width in the direction of the longitudinal axis 12. The connector 10 and the bush 22 can be made of the same plastic In the prior art, the problems of loosening of the connection and its untightness frequently occurred. The advantage of making the connector and the bush of the same material is that during temperature fluctuations these components have the same expansion changes. It is thereby guaranteed that during a heating stage the connection of the components does not become loose or untight since they expand identically, and during a cooling stage they shrink identically. Thereby no loosening or untightening of the connection can occur. The bush 22 is fixed on the tube 20 in the direction of the longitudinal axis 12, or in other words is not displaceable on this tube. To that end, the tube 20 can have two protuberances 26, spaced apart from one another in the direction of the longitudinal axis 12 by approximately the width of the bush 22, that protrude outward from its outer circumference. From the end of the tube 22, the bush 22 can then be slipped over one of the protuberances 26, causing elastic flaring, thus being disposed between the protuberances 26 and being fixed in the direction of the longitudinal axis 12.

In the process of being attached to the connector 10, the tube 20 is slipped onto the connector 10 in the direction of the longitudinal axis 12. This widens the tube 20, and the collars dig into the inner circumference of the tube 20, deforming it plastically. As the tube is slipped onto the connector 10, the bush 22 is widened elastically and is disposed, in the final position of the tube 20, in the region of the collar 14a. Because of the prestressed bush 22, a pressure is exerted on the tube 20 in the region of the collar 14a, thus achieving reliable sealing even if the tube 20 should widen after being heated severely. If the connector 10 and the bush 22 are made of the same plastic, then on heating they expand to approximately equal extents, so that essentially the same pressure continues to be exerted as in the unheated state. The bush 22 is designed in terms of its dimensions such that the tolerances and lack of roundness of the connector 10 and tube 20 are compensated for. Because the bush 22 is fixed between the protruberances 26 in the direction of the longitudinal axis 12, it is assured that the bush will not be shifted when the tube 20 is slipped onto the connector 10. The additional collars 14 that dig into the tube 20 provide the security that the tube 20 cannot slip off or be pulled off.

We claim:

1. An attachment arrangement, comprising a fuel line formed as a plastic tube; and a connector for connecting said fuel line to a fuel supply system, said connector having a plurality of collars spaced from one another in a direction of a longitudinal axis of said connector and protruding from an outer circumference of said connector; an elastically widenable bush arranged on said plastic tube of said fuel line in a region which is slippable onto said connector, said connector and said bush being composed of a same plastic, and said plastic tube which forms said fuel line being formed as a rigid tube.

2. An attachment arrangement as defined in claim 1 wherein said plastic tube which forms said fuel line has two outward-protruding protruberances which are spaced apart from one another in direction of said longitudinal axis, said bush being located between said protruberances.

3. An attachment arrangement as defined in claim 1, wherein at least a first one of said collars which is located closest to a free end of said connector protrudes less far from the outer circumference of said connector than other of said collars, said bush being located in a region of said first collar when said plastic tube of said fuel line is located on said connector.

4. An attachment arrangement as defined in claim 1, wherein at least a first one of said collars located closest to a free end of said connector has less sharp edges than other of said collars, said bush being located in a region of said first collar when said plastic tube of said fuel line is located in said connector.

* * * * *